United States Patent [19]
Itafuji

[11] Patent Number: 5,819,782
[45] Date of Patent: Oct. 13, 1998

[54] GAS SUPPLY UNIT

[75] Inventor: Hiroshi Itafuji, Komaki, Japan

[73] Assignee: CKD Corporation, Japan

[21] Appl. No.: 777,046

[22] Filed: Dec. 30, 1996

[30] Foreign Application Priority Data

Jan. 5, 1996 [JP] Japan .................................. 8-017156
Jul. 10, 1996 [JP] Japan .................................. 8-180383

[51] Int. Cl.⁶ ..................................................... F16K 3/36
[52] U.S. Cl. ........................ 137/240; 137/269; 137/271; 137/884
[58] Field of Search ................................. 137/240, 269, 137/271, 487.5, 884, 606

[56] References Cited

U.S. PATENT DOCUMENTS

| | | | |
|---|---|---|---|
| 1,797,591 | 3/1931 | Sartakoff . | |
| 2,834,368 | 5/1958 | Gray | 137/271 |
| 3,234,964 | 2/1966 | Tinsley et al. | 137/884 |
| 3,513,876 | 5/1970 | Tarbox | 137/269 |
| 3,654,960 | 4/1972 | Kiernan | 137/271 |
| 3,817,269 | 6/1974 | Raymond | 137/269 |
| 4,082,108 | 4/1978 | Dininio | 137/271 |
| 4,257,439 | 3/1981 | Mayeaux | 137/606 |
| 4,383,547 | 5/1983 | Lorenz et al. . | |
| 4,558,845 | 12/1985 | Hunkapiller | 137/606 |
| 4,714,091 | 12/1987 | Wagner | 137/271 |
| 4,741,354 | 5/1988 | DeMild, Jr. . | |
| 5,368,062 | 11/1994 | Okumura et al. . | |

FOREIGN PATENT DOCUMENTS

| | | | |
|---|---|---|---|
| 6-241400 | 8/1994 | Japan . | |
| 2076116 | 11/1981 | United Kingdom | 137/240 |

*Primary Examiner*—Denise L. Ferensic
*Assistant Examiner*—John Ball
*Attorney, Agent, or Firm*—Finnegan, Henderson, Farabow, Garrett, & Dunner, L.L.P.

[57] ABSTRACT

To provide a small-sized gas supply unit dispensing with connection parts or the like such as joints, pipes or the like among components or a gas supply unit facilitating maintenance of a manual valve or the like, the gas supply unit is provided with opening and closing valves for regulating flow of supply gas flowing in channels, a mass flow controller controlling the flow rate of the supply gas and a purge valve for supplying a replacement gas excluding the supply gas remaining in the mass flow controller, wherein a series of fixing blocks in which channels for making the supply gas and the purge gas flow are formed and which have first attaching portions for fixedly installing the opening and closing valves, the mass flow controller and the purge valve above the channels, are provided with second attaching portions by which fluid element parts communicating with the supply gas channels or the purge gas channels can be attached from a direction the same as that of the first attaching portion.

9 Claims, 14 Drawing Sheets

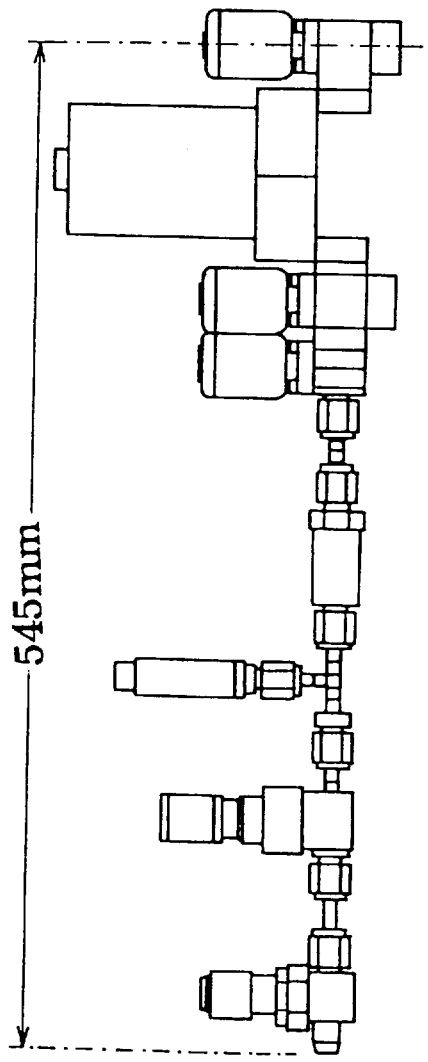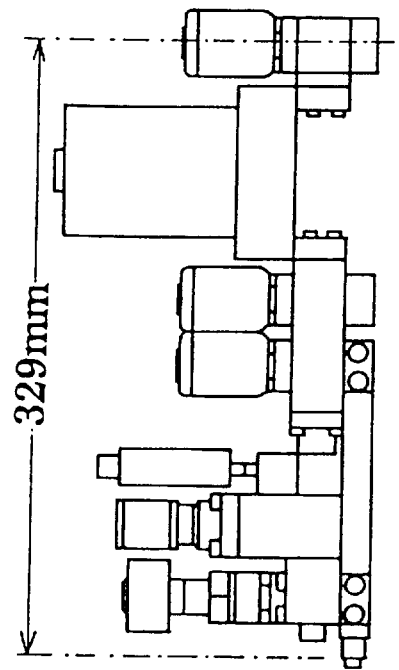
FIG.7(a)
(PRIOR ART)
FIG.7(b)

GAS SUPPLY UNIT

BACKGROUND OF THE INVENTION

1. Field of the Invention:

The present invention relates to a gas supply unit used in an industrial manufacturing device such as a semiconductor manufacturing device or the like, more in details to a compact gas supply unit facilitating detachment of component parts.

2. Description of Related Art:

Conventionally, in steps of manufacturing a semiconductor, corrosive gas is used in an etching process for forming a photoresist etc. The photoresist formation (photoresist coating, exposure, development, etching) is repeated for a plural number of times by changing kinds of corrosive gases in the steps of manufacturing a semiconductor and therefore, in actual steps of manufacturing a semiconductor, a gas supply unit supplying as necessary plural kinds of corrosive gases is used.

Here, a gas supply unit supplying gas is provided with a mass flow controller for accurately measuring the flow rate, inlet and outlet opening and closing valves and a purge valve installed at the front and rear of the mass flow controller for preventing a supply gas such as a corrosive gas etc. from remaining in the mass flow controller and a filter for removing mixed impurities in the supply gas and is provided with a manual valve for carrying out supply or isolation of the supply gas, a regulator for regulating the gas pressure of the supply gas and the pressure gage for monitoring the pressure of the supply gas. Further, the conventional gas supply unit is constituted by connecting in series these component parts.

Here, FIG. 14 illustrates a conventional gas supply unit. From left of FIG. 14, an output port of a manual valve block 101 is connected to an input port of a regulator block 103 via a pipe and joints 102. A manual valve 104 is installed on the manual valve block 101. A regulator 105 is installed on the regulator block 103.

An output port of the regulator block 103 is connected to an input port of a filter 107 via a trifurcated pipe 106 and the joints 102. A pressure gage 108 is installed on the trifurcated pipe 106.

Incidentally, the filter 107 is of a type in which gas is inputted from one side and is outputted to the other side in the longitudinal direction and an output port of the filter 107 is connected to an input port of an input block 109 via a pipe and the joints 102.

On the side of the input block 109, an inlet opening and closing valve 110, a purge valve 111, a mass flow controller 112 and an outlet opening and closing valve 116, are fixedly integrated by the input block 109, a flow direction change block 113, a mass flow controller block 115, a flow direction change block 113 and an output block 114 thereby constituting a mass flow unit.

Specifically, the inlet opening and closing valve 110 and the purge valve 111 are attached onto the input block 109 and an output port of the input block 109 is connected to an input port of the flow direction change block 113. An output port of the flow direction change block 113 is connected to an input port of the mass flow controller block 115. Further, the mass flow controller 112 is attached onto the mass flow controller block 115.

An output port of the mass flow controller block 115 is connected to an input port of the output block 114 via the flow direction change block 113. The outlet opening and closing valve 116 is attached onto the output block 114. Additionally, the outlet opening and closing valve 116 is connected to a supply gas pipe communicating with a vacuum chamber where etching is carried out.

Incidentally, the mass flow unit is publicly known as has been suggested and described by the applicants in, for example, Japanese Unexamined Patent Publication No. Hei 6-241400.

Meanwhile, complicated steps of etching are carried out in one vacuum chamber by switching to use plural kinds of corrosive gases. Accordingly, there is a case where, for example, seven kinds of corrosive gases etc. are needed to be supplied to one vacuum chamber. Therefore, in that case the series of above-described gas supply unit is needed for each gas and seven gas supply units are installed to each vacuum chamber.

FIG. 15 is a perspective view showing a gas supply device that is a second conventional example.

As shown by FIG. 15, according to a gas supply unit 120 constituting the gas supply device, an inlet opening and closing valve 110 and an outlet opening and closing valve are provided in the front and rear of a mass flow controller 112 in series to prevent supply gas such as corrosive gas etc. from remaining in the mass flow controller 112.

Also, a purge valve 111 for supplying nitrogen gas that is a replacement gas for excluding supply gas remaining in the mass flow controller 112, is connected to a purge gas common channel 121 which is shunted from a nitrogen gas pipe and which is provided with a purge switch valve, via a check valve 122.

Here, the check valve 122 is installed on the pipe line to prevent supply gas that is corrosive gas etc. from flowing to the purge gas common channel 121. When corrosive gas is made to flow to the purge gas common channel 121, the inside of the purge gas common channel 121 may be corroded and particles may be formed.

According to the gas supply unit 120, the inlet opening and closing valve 110 and the purge valve 111 are fixed onto a block 123 in which channels are formed, by bolts and a plurality of the mass flow controllers 112 are fixed to blocks 124 which are connected to the blocks 123 and in which channels are also formed. Further, a purge block 125 is fixed to a side portion of the block 123 and the check valve 122 is connected to a purge pipe 126 extended from the purge block 125 whereby the purge pipe 126 is connected to the purge gas common channel 121.

However, the conventional devices involve the following problems.

(1) The first conventional gas supply unit becomes large-scaled since the manual valve 104, the regulator and the like are connected via the joints 102 and the pipes. Especially, separate and respective gas supply units are used in accordance with the kinds of corrosive gases used and therefore, these gas supply units are arranged together in parallel which necessitates a wider installing space.

(2) Parts constituting the pressurizing system comprising the manual valve 104, the regulator 105 and the pressure gage 108 and the filter 107 are connected by the joints 102 and the pipes and therefore, in operation such as maintenance or the like the respective joints 102 must be attached and detached whereby much time and labor is required.

(3) According to the second conventional example of the gas supply unit 120, the purge block 125 for supplying purge gas is installed to pipings of the block 123 to which the purge valve 111 is fixed and is connected to the purge gas common channel 121 via the purge pipe 126 and the check valve 122. However, the purge block 125 must be installed at the side portion of the block 123 and therefore, the check valve 122 is arranged by being displaced from a line on which the purge valve 111 and the mass flow controller 112 are arranged. Therefore, the width of the gas supply unit 120 is increased and the gas supply device in which a plurality of the units are arranged, becomes large-scaled.

(4) According to the second conventional example of the gas supply unit 120, joint portions connecting the check valve 122, the purge pipe 126 and the like are constituted by connecting them by welding from the purge gas common channel 121 to the purge block 125. However, by carrying out such a welding connection welded portions are corroded and particles are formed since the gas supply unit 120 per se handles corrosive gas or the like.

SUMMARY OF THE INVENTION

Hence, it is an object of the present invention to provide a small-scaled gas supply unit dispensing with connection parts etc. such as joints or pipes among components or the like or a gas supply unit simplifying maintenance of a manual valve and the like, in order to solve such a problem. A gas supply unit of the present invention is provided with following constitutions.

(1) A gas supply unit having an opening and closing valve regulating flow of supply gas flowing in channels, a mass flow controller for controlling a flow rate of the supply gas and a purge valve for supplying a replacement gas for excluding the supply gas remaining in the mass flow controller, wherein (a) fixing blocks having first attaching portions in which channels for making the supply gas and the purge gas flow are formed and which fixes the opening and closing valve, the mass flow controller and the purge valve above the channels, are provided with second attaching portions to which fluid element parts communicating with the supply gas channel or the purge gas channel are attachable from a first direction the same as a direction of the first attaching portions.

(2) The gas supply unit described in (1), wherein the fluid element parts constitute a pressurizing system unit in which a manual valve manually carrying out supply or isolation of the supply gas, a regulator for regulating gas pressure of the supply gas and a pressure gage for monitoring the gas pressure of the supply gas, are fixedly integrated via the fixing blocks where the channels are formed.

(3) The gas supply unit described in (2), wherein the fixing blocks constituting the pressurizing system unit, are provided with a manual valve block to which the manual valve is attached and the manual block is provided with a screw-fastening portion for fastening the fixing blocks to a base.

(4) The gas supply unit described in (3), wherein (a) the fixing blocks constituting the pressurizing system unit are provided with a regulator block to which the regulator is attached, (b) a first channel for communicating a pipe supplying a gas, with a manual valve, a second channel for communicating the manual valve with the regulator and a third channel for communicating the regulator with a channel formed in the base, are formed in the manual valve block and the regulator block, and (c) the regulator block is screw-fastened to the manual valve block from a direction orthogonal to the first direction.

(5) The gas supply unit described in (4), wherein (a) the fixing blocks constituting the pressurizing system unit are provided with a pressure gage block to which the pressure gage is attached, and (b) the pressure gage block is screw-fastened to the regulator block from a direction orthogonal to the first direction.

(6) The gas supply unit described in (2), wherein (a) the fixing blocks constituting the pressurizing system unit are constituted by the manual valve block, the regulator block and the pressure gage block, (b) a first channel for communicating a pipe supplying a gas, with the manual valve, a second channel for communicating the manual valve with the regulator, a third channel for communicating the regulator with a channel formed in the base and a fourth channel for communicating the pressure gage with the third communicating channel, are formed in the fixing blocks and (c) the screw-fastening portion for fastening the fixing blocks to the base is provided at the manual valve block and a joint connecting the third channel to the channel formed in the base is formed in the manual valve block.

(7) The gas supply unit described in (2), wherein the manual valve block, the regulator block and pressure gage block constituting pressurizing system unit are integrally formed.

(8) The gas supply unit described in (1), wherein the fluid element part is a check valve for preventing the supply gas from flowing to the side of supplying the purge gas.

(9) The gas supply unit described in (8), wherein the first fixing portion for fixedly installing the filter, the opening and closing valve, the purge valve and the flow controller and the second fixing portion for fixedly installing the check valve are installed on a straight line in a plane view.

The gas supply unit having such a constitution of the present invention operates as follows.

The supply gas flowing through the manual valve, the regulator and the pressure gage is sent via the channels formed in the fixing blocks integrally fixed and therefore, the gas supply unit per se becomes small-sized by omitting connection parts such as joints or pipes among components or the like and the fixing blocks are screw-fastened to the base where the channels are communicated with the side of the mass flow unit from a direction the same as the first direction of respective component parts constituting the mass flow unit and therefore, attachment and detachment of the manual valve or the like are facilitated and the maintenance thereof is simplified.

According to the gas supply unit of the present invention, when the screw-fastening unit for fastening the manual valve block constituting the fixing blocks to the base is fixed, the joint portion connecting the third channel formed in the manual block and the channel in the base is strongly tightened whereby the air tight performance of the channels is promoted.

According to the gas supply unit of the present invention, the fixing blocks constituting the pressurizing system unit are integrally formed and joint portions of the channels formed in the blocks are dispensed with whereby the air tight performance of the channels is promoted.

According to the gas supply unit of the present invention, the supply gas or the purge gas is made to flow through the channels formed in the fixing blocks and the filter, the opening and closing valve, the mass flow controller, the purge valve and the check valve which are fixed onto the first and the second attaching portions of the fixing blocks such that they are disposed above the channels whereby the unit per se can be made compact and the pipes and the like are not necessary to connect to each other by using a welding process and therefore, formation of particles due to the welding can be prevented.

According to the gas supply unit of the present invention, the filter, the opening and closing valve, the purge valve, the check valve and the mass flow controller are fixed onto the first and the second fixing blocks in the same direction and therefore, the unit per se can be made compact.

According to the gas supply unit of the present invention, the filter, the opening and closing valve, the purge valve, the check valve and the mass flow controller are fixed onto the fixing blocks on a straight line in a plane view and therefore, the unit per se can be made compact.

BRIEF DESCRIPTION OF THE DRAWINGS

FIGS. 7(a) and 7(b) are views for comparing a conventional gas supply unit and the gas supply unit in accordance with the present invention;

DETAILED DESCRIPTION OF PREFERRED EMBODIMENTS

An explanation will be given of a first embodiment specifying a gas supply unit in accordance with the present invention in reference to the drawings as follows.

Figure 1:
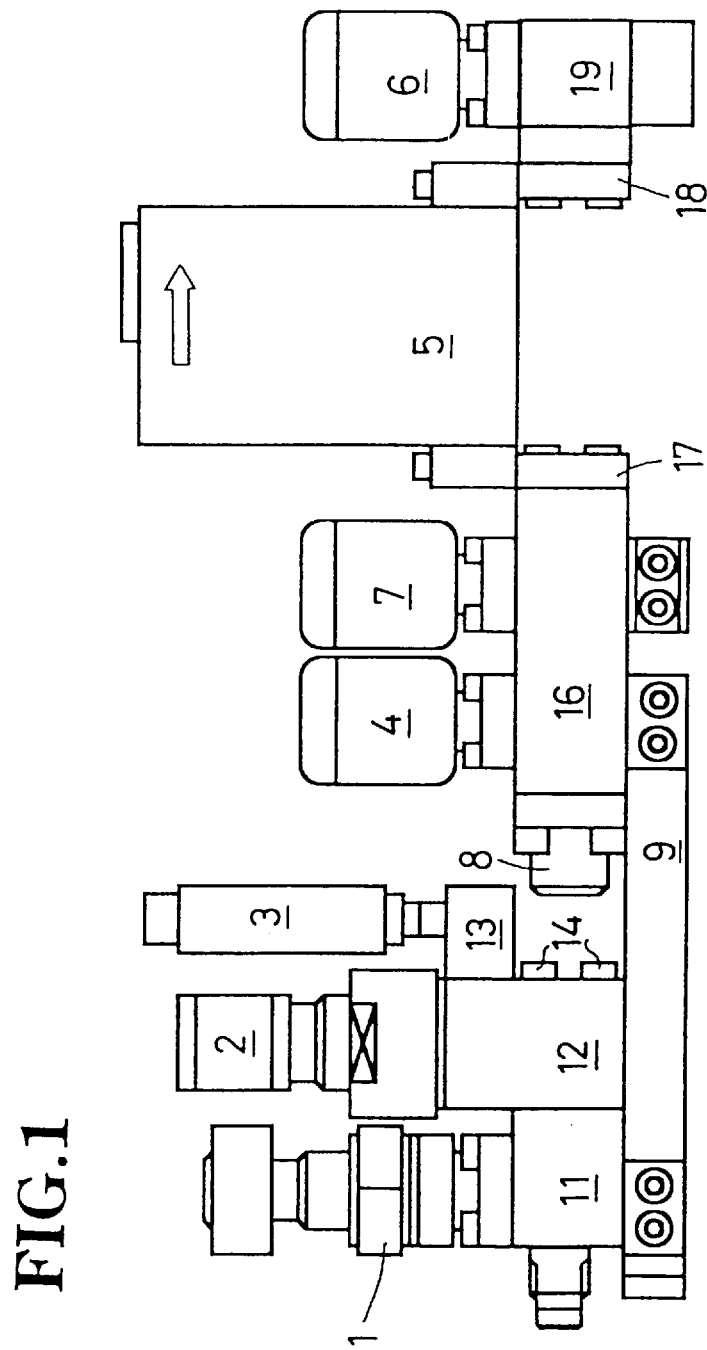
FIG. 1 is a side view showing an embodiment in accordance with a gas supply unit of the present invention.
Figure 2:
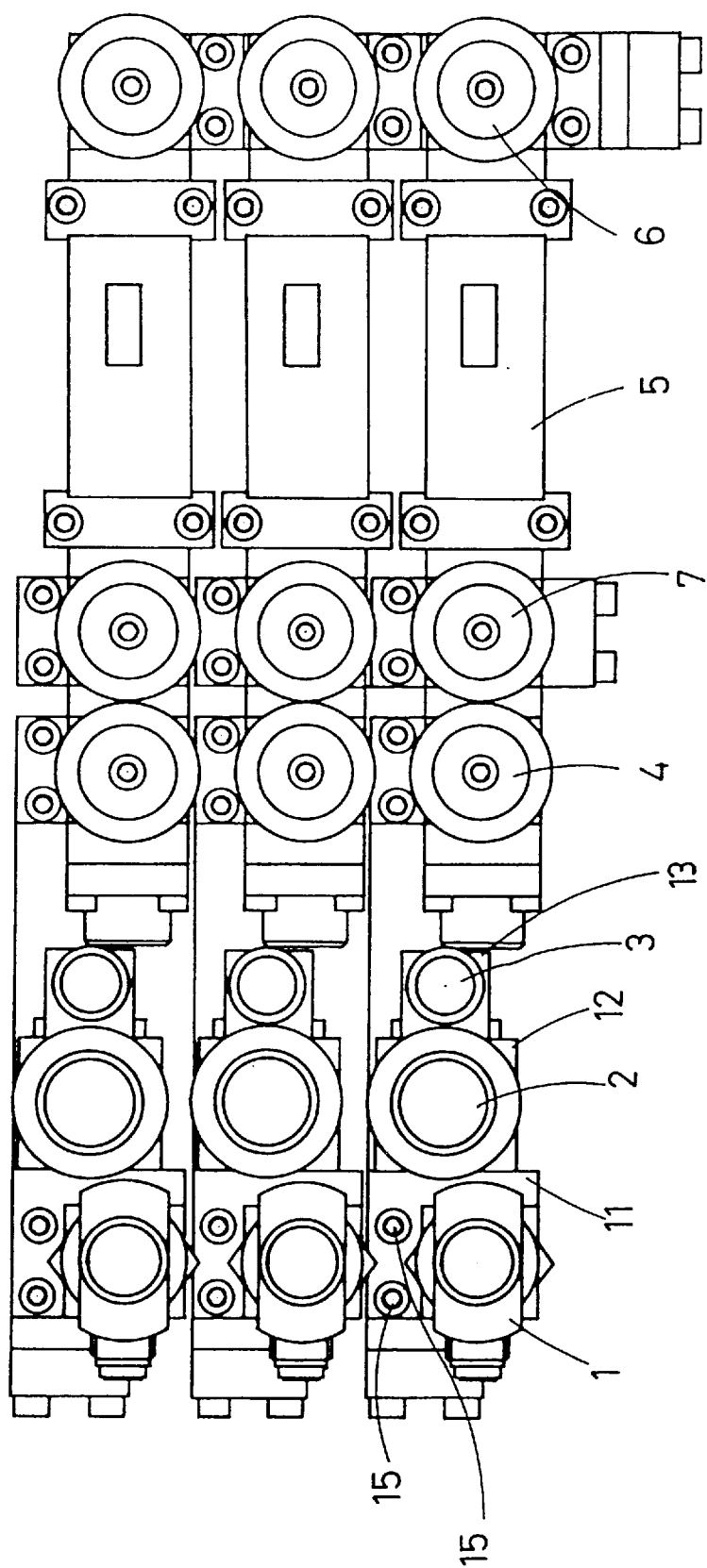
FIG. 2 is a plane view showing the embodiment in accordance with the gas supply unit of the present invention.
Figure 3:
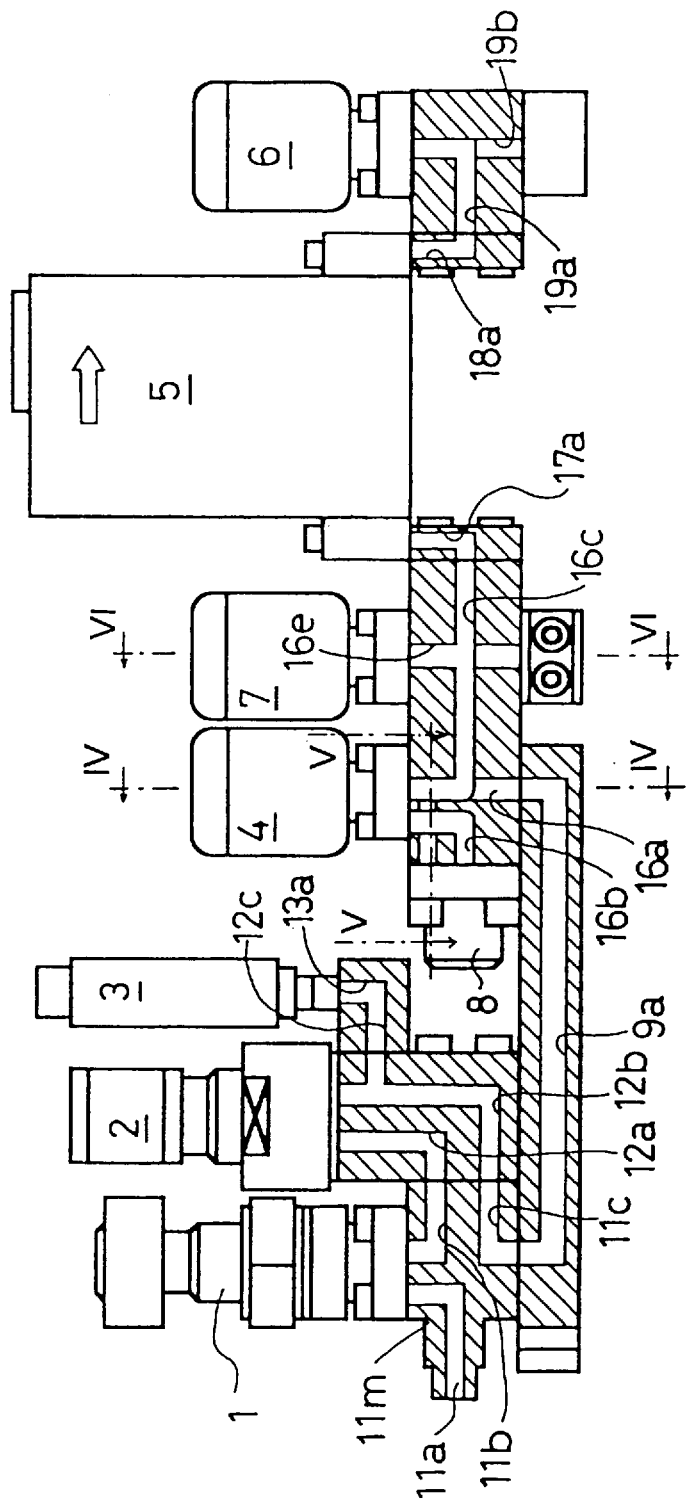
FIG. 3 is a sectional view showing the embodiment in accordance with the gas supply unit of the present invention.

FIG. 1 is a side view showing the constitution of a gas supply unit according to the embodiment and FIG. 2 is a plan view showing a plurality of the gas supply units installed together in parallel. Further, FIG. 3 is a partially cut sectional view showing the gas supply unit.

Firstly, in the gas supply unit of the embodiment, a pressurizing system unit in which a manual valve 1 carrying out supply or isolation of corrosive gas, a regulator 2 for regulating gas pressure of the corrosive gas and a pressure gage 3 for monitoring the pressure of the corrosive gas are integrated, is constituted.

According to the pressurizing system unit, the manual valve 1, the regulator 2 and pressure gage 3 are respectively and integrally fixed to a series of fixing blocks constituted by a manual valve block 11, a regulator block 12 and a pressure gage block 13 in each of which channels are formed. The series of fixing blocks are integrated by fixing the regulator block 12 to which the pressure gage block 13 is fixed, to the manual valve block 11 by bolts 14 from the horizontal direction.

Further, the pressurizing system unit which is integrated to the series of fixing block is fixed to a base 9 by bolts 15 penetrating the manual valve block 11 as illustrated by Fig.

A pipe of corrosive gas that is the supply gas is connected to a pipe connecting portion 11m of the manual valve block 11. An input channel 11a communicating from the pipe connecting portion 11m to an input port of the manual valve 1 and an output channel 11b communicating an output port of the manual valve 1 to the side of the regulator are formed in the manual valve block 11. Also, a connecting channel 11c for sending gas returned from the regulator 2 to a channel 9a formed in the base 9, is formed in the manual valve block 11. Meanwhile, an input channel 12a for communicating the output channel 11b of the manual valve block 11 with an input port of the regulator 2 and an output channel 12b for communicating an output port of the regulator 2 with the connecting channel 11c of the manual valve block 11 are formed in the regulator block 12. Further, a measuring channel 12c for communicating to a channel 13a formed in the pressure gage block 13 is formed to the output channel 12b.

The output channel 12b of the regulator block 12 is not directly communicated with the channel 9a of the base 9 but via the communicating channel 11c of the manual valve block 11 since the manual valve block 11 is fixed to the base 9 from above by tightening the manual valve block 11 by the bolts 15 whereby the contact pressure between the manual valve block 11 and the base 9 is increased and accordingly, the air tight performance of the joint portion between the connecting channel 11c and the channel 9a is enhanced. Further, the screw-fastening portions by the bolts 15 are formed at the manual valve block 11 since the lateral width of the manual valve 1 is smaller than that of the regulator 2 and therefore, the screw-fastening portions can be provided compactly among the gas supply units installed together in parallel.

Meanwhile, the channels between the manual valve block 11 and the regulator block 12 are formed by the output channel 11b and the input channel 12a, and the output channel 12b and the communicating channel 11c, along the bolts 14 for fixing the both blocks whereby the air tight performance at the joint portions is enhanced.

An input block 16 is fixed to the output side of the channel 9a of the base 9 whereby a mass flow unit is constituted.

According to the mass flow unit, an inlet opening and closing valve 4, a purge valve 7 and a filter 8 are directly attached to the input block 16, a mass flow controller 5 is connected to the input block 16 via a flow direction change block 17 and the mass flow controller 5 is connected to an output block 19 to which an outlet opening and closing valve 6 is attached, via a flow direction change block 18.

Each of the inlet opening and closing valve 4, the mass flow controller 5, the outlet opening and closing valve 6 and the purge valve 7 constituting the mass flow unit, is fixed to each of the blocks from above by bolts.

Next, an explanation will be given of channels of the mass flow unit in reference to FIG. 3 through FIG. 6. Here, FIGS.

4 through 6 are views of sections of the gas supply unit illustrated by FIG. 3 taken along lines A—A, B—B and C—C, respectively.

Figure 4:
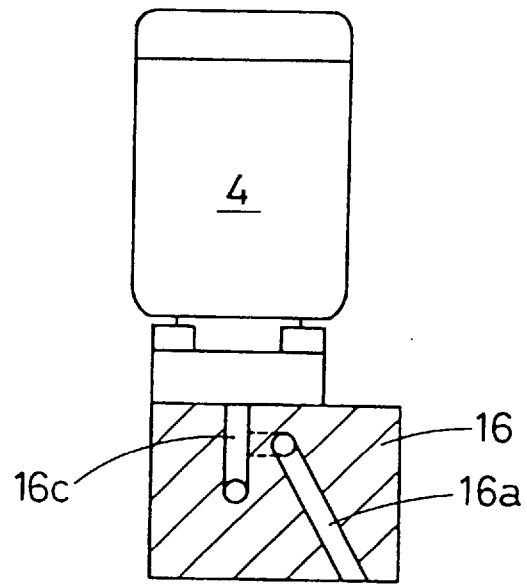
FIG. 4 is a view showing a section taken along a line IV—IV of FIG. 3.
Figure 5:
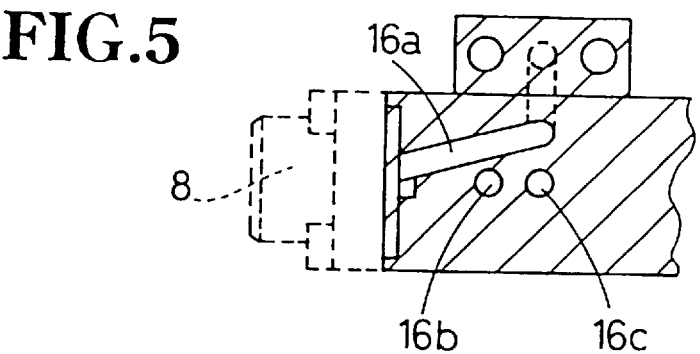
FIG. 5 is a view showing a section taken along a line V—V of FIG. 3.
Figure 6:
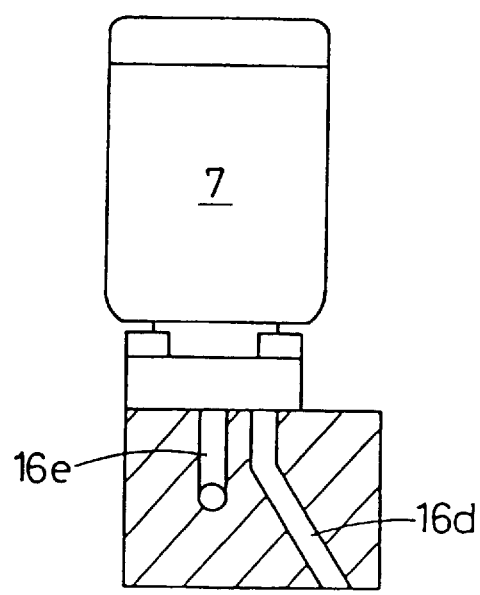
FIG. 6 is a view showing a section taken along a line VI—VI of FIG. 3.

The channel 9a of the base 9 is connected to a filter input channel 16a formed in the input block 16 communicating with the filter 8 (refer to FIG. 4, FIG. 5). Further, an input communicating channel 16b communicating the filter 8 with an input port of the inlet opening and closing valve 4 and an output channel 16c communicating to an output port of the input opening and closing valve 4 are formed in the input block 16. Furthermore, a supply channel 16d connecting an input port of the purge valve 7 to a supply gas pipe of a supply tank storing nitrogen gas for purging and a communicating channel 16e communicating an output port of the purge valve 7 to an output channel 16c, are formed in the input block 16 (refer to FIG. 6).

A flow change channel 17a formed in the flow direction change block 17 is connected to the output path 16c and the flow change path 17a is connected to an input port of the mass flow controller 5. Meanwhile, a flow change channel 18a of the flow direction change block 18 is connected to an output port of the mass flow controller 5. The flow change channel 18a is connected to an input channel 19a formed in the output block 19 communicating with an input port of the outlet opening and closing valve block and an output channel 19b is connected to an output port of the outlet opening and closing valve 6. Additionally, the output channel 19b is connected to a supply gas pipe communicating with a vacuum chamber where etching is carried out.

According to the gas supply unit of the embodiment constituted as described above, corrosive gas supplied from the pipe connecting portion 11m is made to flow from the input channel 11a to the output channel 11b by opening the manual valve 1. The corrosive gas that is made to flow from the input channel 12a to the regulator 2 is controlled in respect of the pressure, is made to flow to the output channel 12b, is again returned to the manual valve block 11 and is made to flow to the channel 9a of the base 9 from the connecting channel 11c. Further, the corrosive gas that is controlled in respect of the pressure by the regulator 2 is made to flow to the pressure gage 3 by passing through the measuring channel 12c and the channel 13a and is monitored there.

In this way the corrosive gas which has passed through the pressurizing system unit, is made to flow to the side of the mass flow unit. With respect to the mass flow unit, the applicants have suggested and described in Japanese Unexamined Patent Publication No. Hei 6-241400 and therefore, a detailed explanation thereof will be omitted.

As stated above, according to the gas supply unit of the embodiment, the inlet opening and closing valve 4 and the outlet opening and closing valve 6 on the transfer channel of the corrosive gas for isolating the flow of the corrosive gas, the mass flow controller 5 disposed at the middle of the inlet opening and closing valve 4 and the output opening and closing valve 6 for controlling the flow rate of corrosive gas and the purge valve 7 for controlling the supply of the replacement gas, are constituted as the mass flow unit and the pressurizing system unit integrated with the manual valve 1, the regulator 2 and the pressure gage 3 is constituted whereby the gas supply unit can be downsized. Specifically, as shown by FIGS. 7(a) and 7(b), according to the constitution of the conventional gas supply unit illustrated by FIG. 7(a), the total length is 545 mm since the conventional unit is connected by the joints and the pipes whereas according to the constitution of the gas supply unit in accordance with the embodiment illustrated by FIG. 7(b), and total length is 329 mm whereby the unit is made compact since the pressurizing system unit is formed by the channels and integrated by the series of fixing blocks. Also, this improvement results in an effect whereby formation of particles due to corrosive gas is restrained by decreasing the number of connecting points among components.

Further, according to the gas supply unit of the embodiment, in addition to the fact that the inlet opening and closing valve 4, the mass flow controller 5, the outlet opening and closing valve 6 and the purge valve 7 constituting the mass flow unit are all attached from above by bolts, the pressurizing system unit is similarly attached from above by the bolts and accordingly, attachment and detachment of respective component parts can be carried out from the same direction whereby operation such as maintenance etc. is simplified.

The joint portion of the channel is provided at the manual valve block 11 for communicating the pressurizing system unit with the base and therefore, the screw-fastening portions can be provided along the manual valve having a small lateral width whereby not only a compact space can be achieved but the air tight performance of the joint portion can be enhanced.

Incidentally, the gas supply unit of the present invention is not limited to the above-described embodiment but can be modified variously within a range from which the gist of the present invention is not deviated.

For example, according to the above-described embodiment the manual valve block 11 and the regulator block 12 constituting the channels between the manual valve 1 and the regulator 2 constituting the pressurizing system unit, are integrated by fixing them by the bolts. However, they may be integrated to one block constituting the similar channels without separating them at the initial stage.

Next, an explanation will be given of a second embodiment of the present invention.

Figure 8:
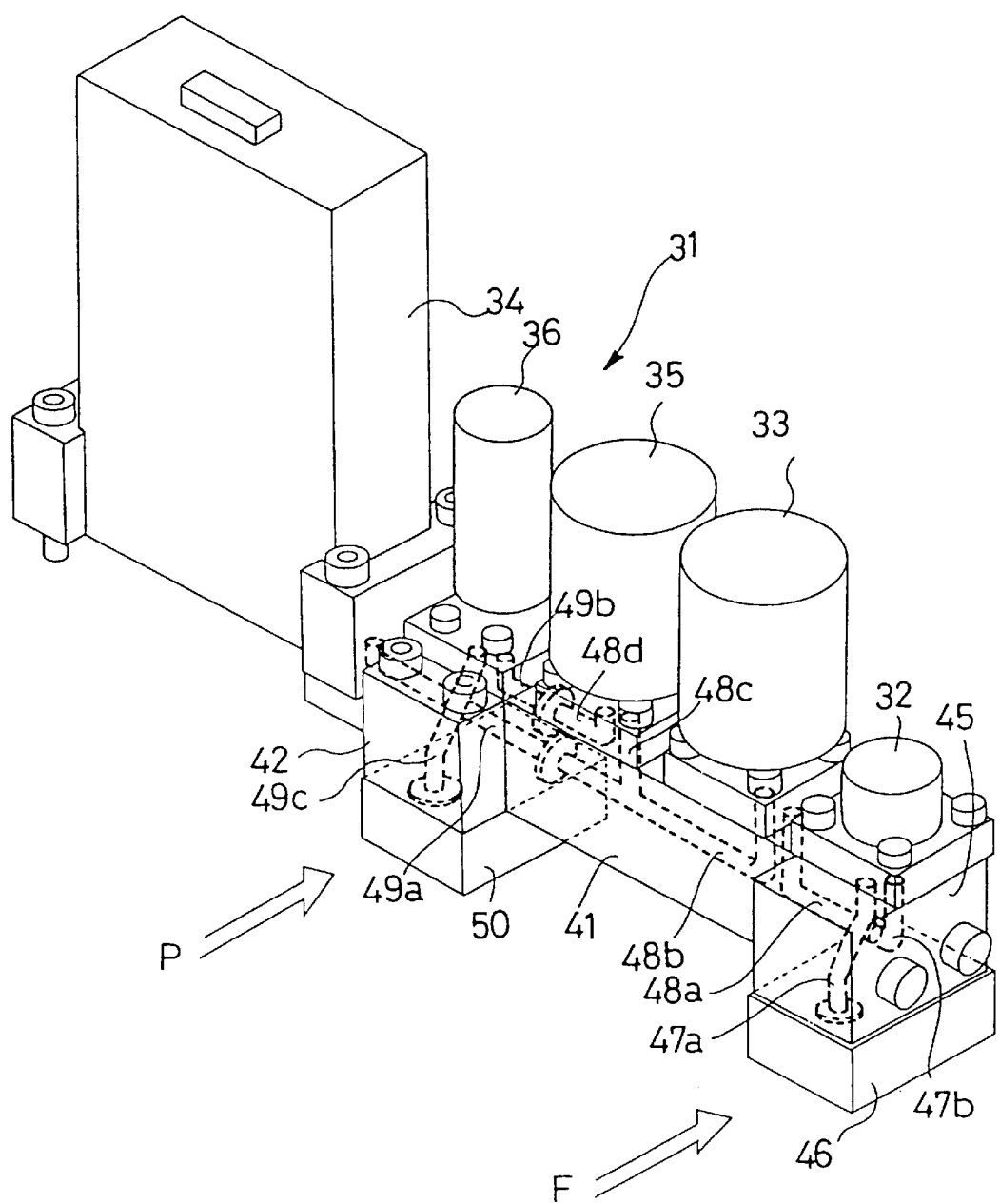
FIG. 8 is a perspective view showing an embodiment of a gas supply integrated unit in accordance with the present invention.
Figure 9:
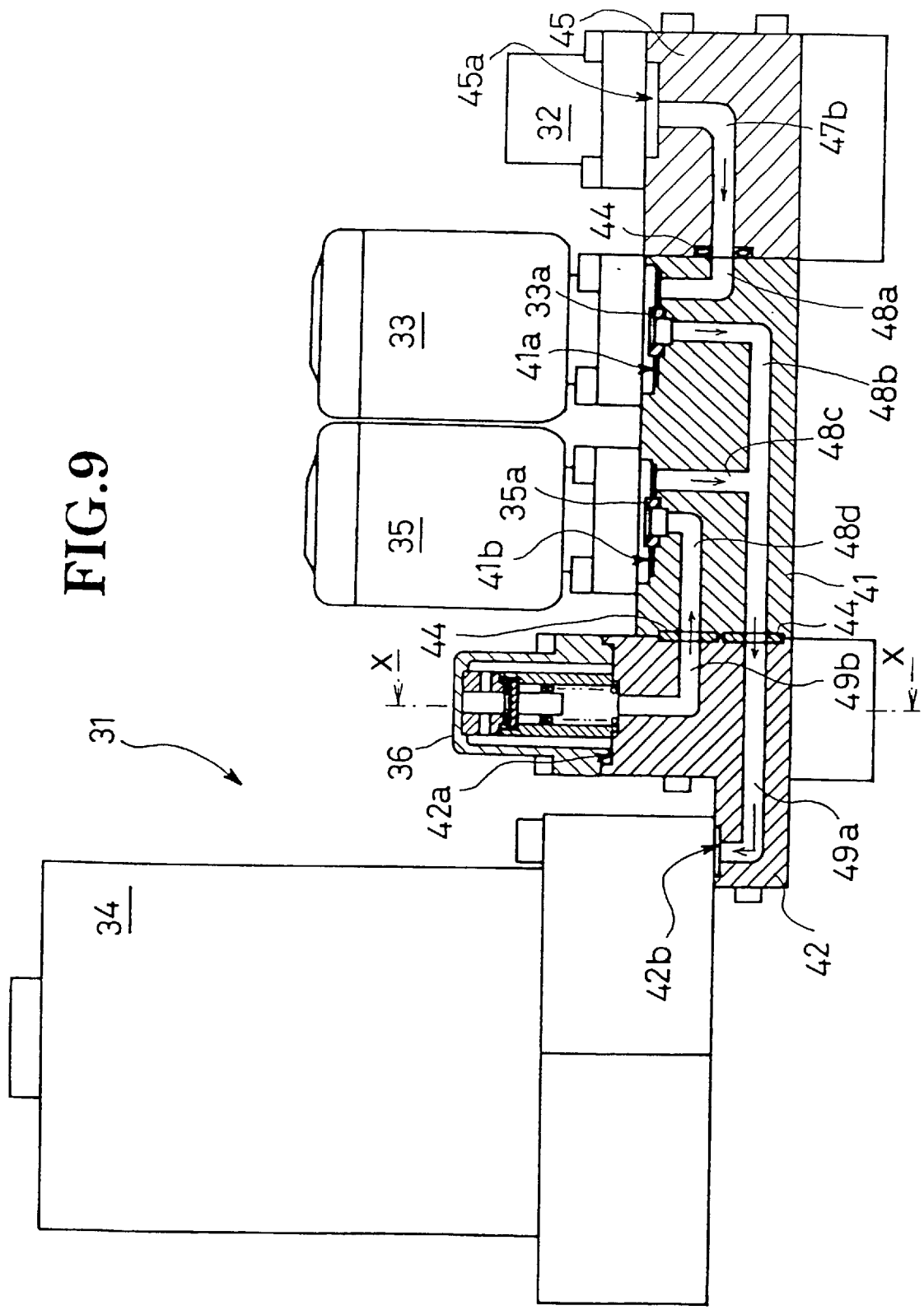
FIG. 9 is a partially cut sectional view showing the embodiment of the gas supply integrated unit in accordance with the present invention.

FIG. 8 is a perspective view showing a gas supply unit that is the second embodiment and FIG. 9 is a partially cut sectional view showing the gas supply integrated unit.

The gas supply unit 31 in this embodiment is used in a gas supply device in which the kinds of corrosive gases are changed and the plural kinds of corrosive gases are supplied as necessary in semiconductor manufacturing steps similar to the above-described devices in the conventional examples. The gas supply unit 31 is also constituted by a filter 32 for removing mixed impurities of a supply gas F that is a corrosive gas, a main valve 33 for isolating the flow of the supply gas F, a mass flow controller 34 for accurately measuring the flow rate, a purge valve 35 for supplying nitrogen gas (hereinafter, "purge gas") P that is a replacement gas for excluding the supply gas F remaining in the mass flow controller 34 and a check valve 36 for preventing the supply gas F that is the corrosive gas or the like from flowing to the purge gas common supply side.

As shown by FIG. 9, a filter block 45 for fixing the filter 32, a first block 41 for fixing the main valve 33 and the purge valve 35 and a second block 42 for fixing the mass flow controller 34 and the check valve 36, are integrated to constitute a series of fixing blocks characterizing the gas supply unit 31 of the embodiment.

Here, the first block 41 is formed in a rectangular parallelepiped, to which the filter block 45 and a gasket 44 are fitted to integrate in air tight to prevent the supply gas F from leaking.

Figure 10:
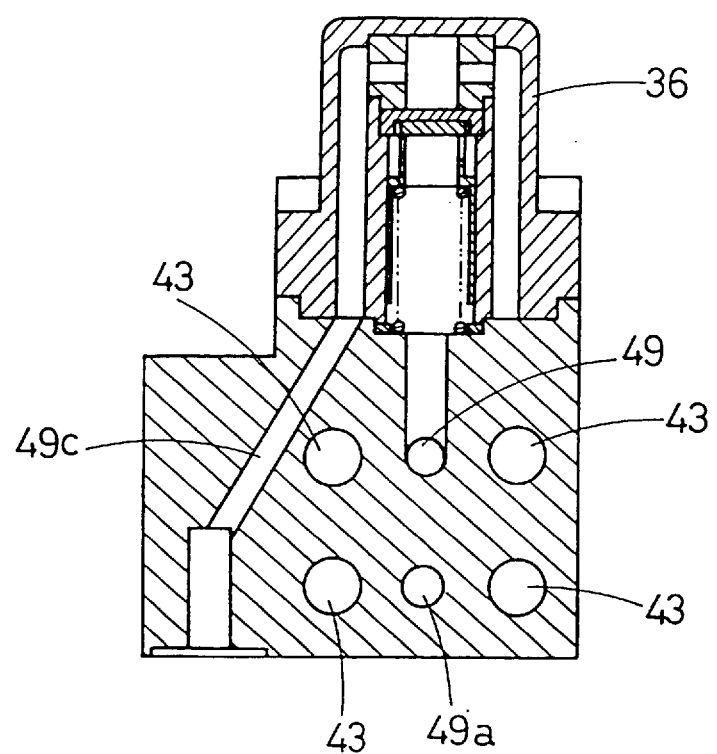
FIG. 10 is a sectional view showing a check valve and a fixing block according to the embodiment.

FIG. 10 is a sectional view taken along a line X—X of FIG. 9. As shown by FIG. 10 channels of gases, mentioned later, are formed in the second block 42 and female screws 43 are cut for fixing the second block 42 to the first block 41 by bolts. The gaskets 44 are fitted to junctions of gas channels between the first block 41 and the second block 42 to integrate them in air tight to prevent the supply gas F and the purge gas P from leaking.

Attaching portions 41a and 41b of the main valve 33 and the purge valve 35 are formed on the top face of the first block 41 in the longitudinal direction. An attaching portion 42a of the check valve 36 is formed on the top face of the second block 42 to dispose on a straight line in a plane view on which the attaching portions 41a and 41b of the first block 41 are also disposed. Further, as shown by FIG. 9, an attaching portion 42b is formed in the flange portion of the second block 42 for fixing the mass flow controller 34 to dispose on the straight line in a plane view on which the attaching portions 41a, 41b and 42a are also disposed. Similarly, an attaching portion 45a is formed on the top face of the filter block 45 for fixing the filter 32.

Therefore, the filter 32, the main valve 33, the purge valve 35, the check valve 36 and the mass flow controller 34 which are fixed to the series of fixing blocks comprising the filter block 45, the first block 41 and the second block 42, are on the straight line as shown by FIG. 8 whereby a single line arrangement arranging them in the same direction is realized. Also, the filter 32, the main valve 33, the purge valve 35, the check valve 36 and the mass flow controller 34 are all attached from above by bolts.

Next, a series of channels are formed in the filter block 45, the first block 41 and the second block 42 to which the respective component parts of the gas supply unit 31 are attached.

First, a filter input channel 47a communicating the supply gas F from a gas supply block 46 to an input port of the filter 32 and a filter output channel 47b for communicating to an output thereof, are formed in the filter block 45.

A main valve input channel 48a for communicating the filter output channel 47b with a valve chamber of the main valve 33 formed at the attaching portion 41a, is formed in the first block 41. A valve seat 33a of the main valve 33 is formed at the attaching portion 41a and a mass flow valve input channel 48b for communicating with a valve hole of the valve seat 33a is formed.

A purge valve output channel 48c of the purge valve 35 installed contiguously to the main valve 33, is joined to the mass flow valve input channel 48b. The purge valve output channel 48c communicates with a valve chamber formed in the attaching portion 41b. Further, a purge valve input channel 48d is formed in the first block 41 to communicate with a valve hole of the valve seat 35a of the purge valve 35 that is formed in the valve chamber.

Further, a mass flow valve input channel 49a and a check valve output channel 49b for respectively communicating with the mass flow valve input channel 48b and a purge valve input channel 48d both formed in the first block 41, are formed in the second block 42.

A purge gas supply block 50 for supplying the purge gas P is fixed to the second block 42 as illustrated in FIG. 8 and a check valve input channel 49c for supplying the purge gas P to the check valve 36 is formed at the flange portion thereof as shown by FIG. 10.

Next, an explanation will be given of the constitution of the check valve 36. Normally-used devices are utilized for the mass flow controller 34 and the like and a detailed explanation thereof will be omitted.

Figure 11:
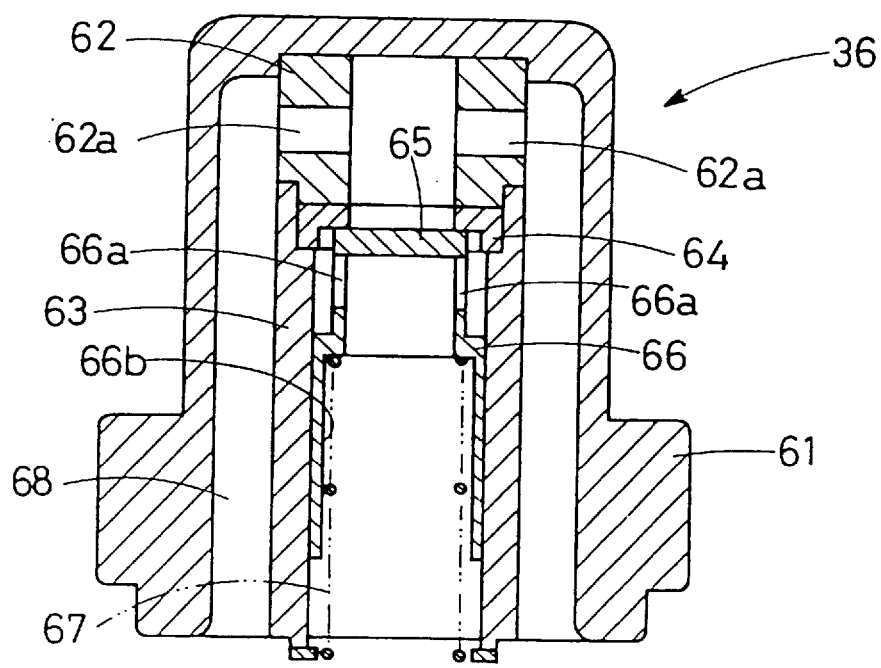
FIG. 11 is a sectional view showing a closing state of the check valve according to the embodiment.
Figure 12:
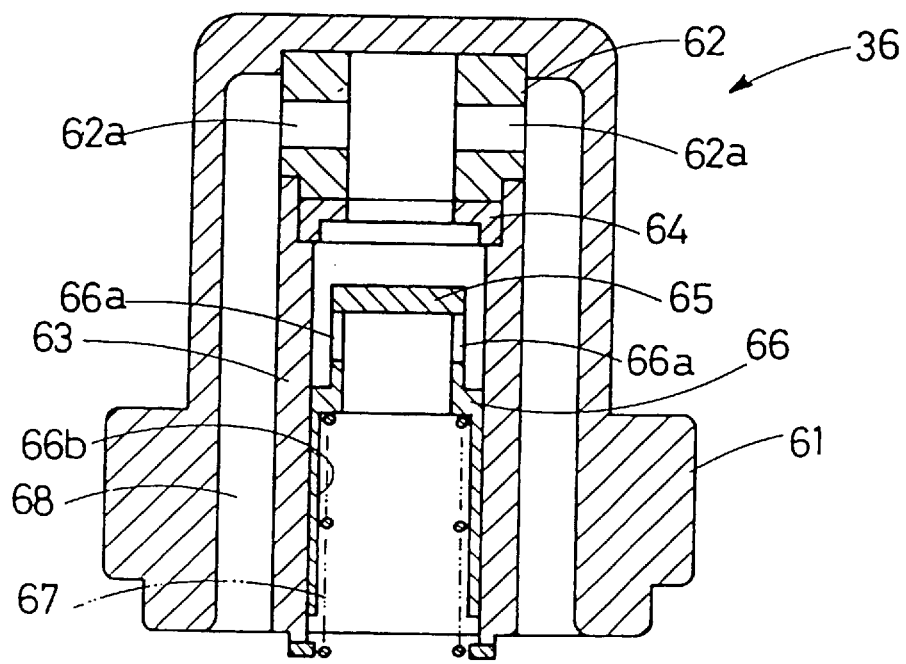
FIG. 12 is a sectional view showing an opening state of the check valve according to the embodiment.

FIG. 11 and FIG. 12 are sectional views showing the check valve where FIG. 11 illustrates a state in which the valve is closed and FIG. 12 illustrates a state in which the valve is opened. According to the check valve 36 the valve is formed in a lid 61 that is directly fixed to the second block 42. As illustrated in the figures the lid 61 is formed in a shape of a hollow cylinder having an opening at one end thereof and a gas input cover 62 in a cylindrical shape in which through holes 62a are formed in the lateral direction and a valve main body 63 in a cylindrical shape having the valve, are integrally and coaxially inserted into the lid 61 from the opening. The gas input cover 62 and the valve main body 63 are not fixed and are provided with a constitution whereby they can be easily decomposed by detaching the lid 61.

A valve seat 64 made of gum is mounted between the gas input cover 62 and the valve main body 63. A piston 66 having a shape of a hollow cylinder is abrasively inserted into the hollow portion of the valve main body 63. Through holes 669a are formed at the upper end side portions of the piston 66 where the valve 65 is attached and the lower end portion thereof is opened. A return spring 67 which is a coil spring is mounted to a hollow end portion 66b of the piston 66 from the opened lower end portion. The upper end of the return spring 67 is brought into contact with a stepped portion of the piston 66 and in attaching the piston 66 the lower end thereof is brought into contact with the attaching portion 42a of the second block whereby the spring is contracted. Accordingly, the return valve 67 urges the piston 66 in a direction in which the valve 65 is brought into contact with the valve seat 64.

As illustrated by FIG. 10, according to the check valve 36 constituted as described above, the check valve input channel 49c communicates with a channel space 68 surrounded by the cover 61 and the valve main body 63 whereas the lower end portion of the valve main body 63 communicates with the check valve output channel 49b whereby the purge gas supply channel is formed.

Next, an explanation will be given of the operation of the gas supply unit 31 of the embodiment constituted as described above.

When a manual valve, not illustrated, is opened, the supply gas F is supplied to the gas supply block 46, and is inputted to the filter 32 via the filter input channel 47a. After removing mixed impurities of the supply gas, the supply gas is made to flow to the filter output channel 47b.

The supply gas F which has been made to flow to the filter output channel 47b, is made to flow from the main valve input channel 48a of the first block 41 to the main valve 33 and is made to flow to the mass flow controller 34 after passing through the mass flow valve input channels 48b and 49a by opening the main valve 33.

Meanwhile, when the purge gas P that is the replacement gas for excluding the supply gas F remaining in the mass flow controller 34, is supplied to the purge gas supply block 50, the supply gas F is made to flow from the check valve input channel 49c to the check valve 36. The purge gas P which has been made to flow from the check valve input channel 49c to the check valve 36, is made to flow from the through holes 62a to the gas input cover 62 after passing through channel space 68 whereby the valve 65 is lowered along with the piston 66 against the urging force of the return spring 67 by the gas pressure of the purge gas P as shown by FIG. 12. Further, when the valve 65 is separated from the valve seat 64, the purge gas P is further made to flow to the inside of the valve main body 63, is made to flow from the through holes 66a to the hollow portion 66b of the piston 66 and is made to flow to the check valve output channel 49b of the second block 42.

Meanwhile, when the supply gas F is made to flow from the check valve output channel 49b to the check valve 36, the supply gas F is not made to flow to the supply side of the purge gas P since the valve 65 is brought into contact with the valve seat 64.

The purge gas P which has been made to flow from the check valve 36, is made to flow to the purge valve 35 by passing through the check valve output channel 49b and the purge valve input channel 48d. By opening the purge valve 35 the purge gas P is made to flow to the purge valve output channel 48c, is made to flow to the mass flow valve input channel 48b and is made to flow to the mass flow controller 34 by passing through the mass flow valve input channel 49a whereby the supply gas F that is the corrosive gas remaining inside of the mass flow controller 34 is replaced and excluded thereby.

Meanwhile, the supply gas F which has been made to flow to the mass flow controller 34, is supplied to a vacuum chamber, not illustrated, where etching is carried out by passing through predetermined pipings, at which etching of wafers is carried out.

As described above according to the gas supply unit 31 of the second embodiment, the following effect is achieved.

The gas supply unit can be made compact by constituting to attach the main valve 33, the mass flow controller 34 and the like to the series of fixing blocks where the filter block 45, the first block 41 and the second block 42 are integrated.

Especially, a gas supply device parallelly installed with a plurality of the gas supply units 31 can be made compact by realizing the single line formation of component parts of the main valve 33, the mass flow controller 34 and the like constituting the gas supply unit 31 by arranging them in the same direction and on the straight line in respect of the series of fixing blocks.

The compact formation of the gas supply device can significantly reduce the occupied area of floor and therefore, problems such as hindrance of operation are resolved, the gas supply device can be arranged at an immediate vicinity of a vacuum chamber whereby supply of gas at a stable flow rate can be realized.

Meanwhile, the gas supply unit 31 per se is attached to the filter block 45, the first block 41 and the second block 42 from above by bolts and therefore, the attachment of respective component parts such as the check valve 36 and the like is facilitated and the maintenance performance is considerably promoted.

Figure 13:
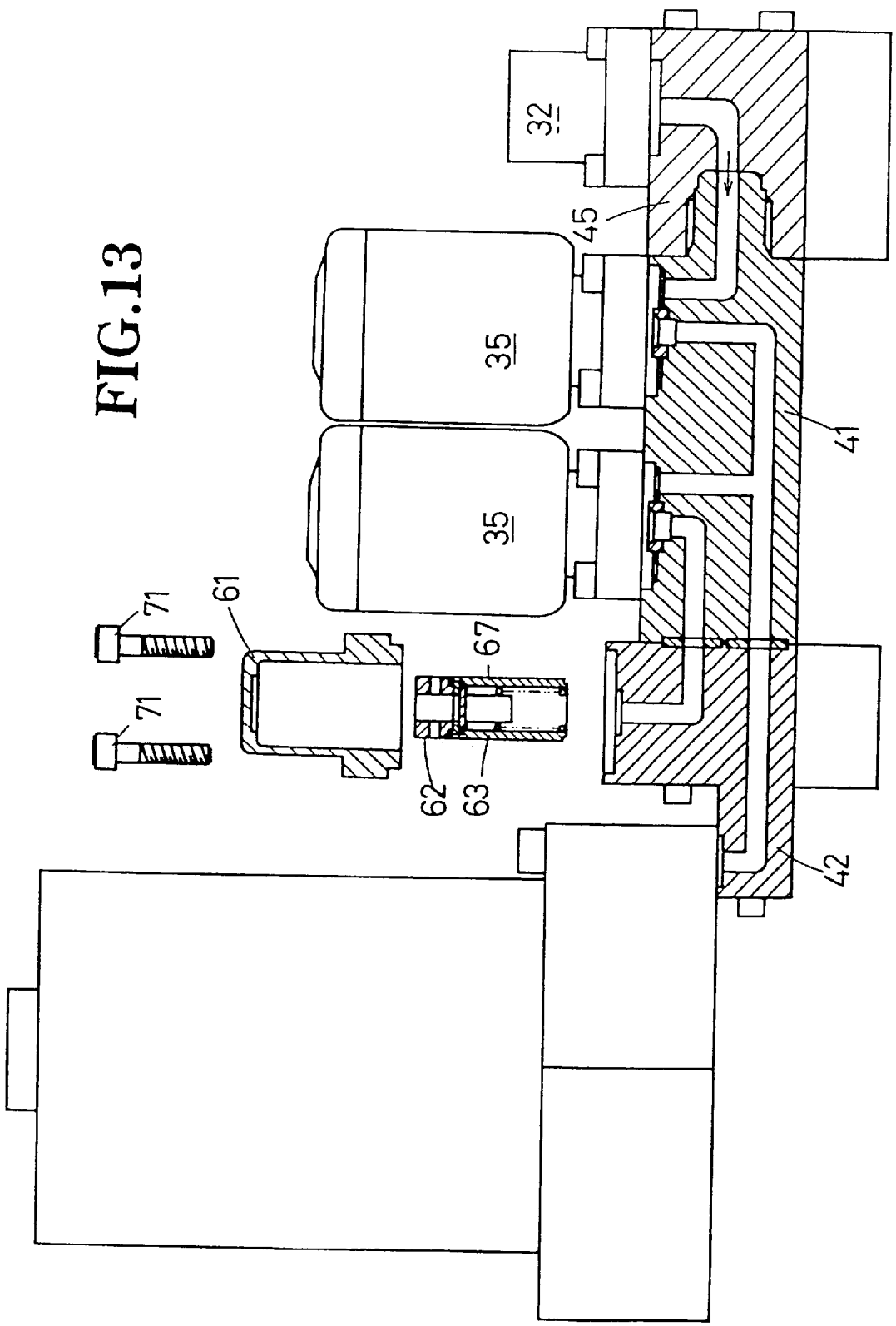
FIG. 13 is a partially cut sectional view showing the embodiment of gas supply integrated unit in accordance with the present invention.
Figure 14:
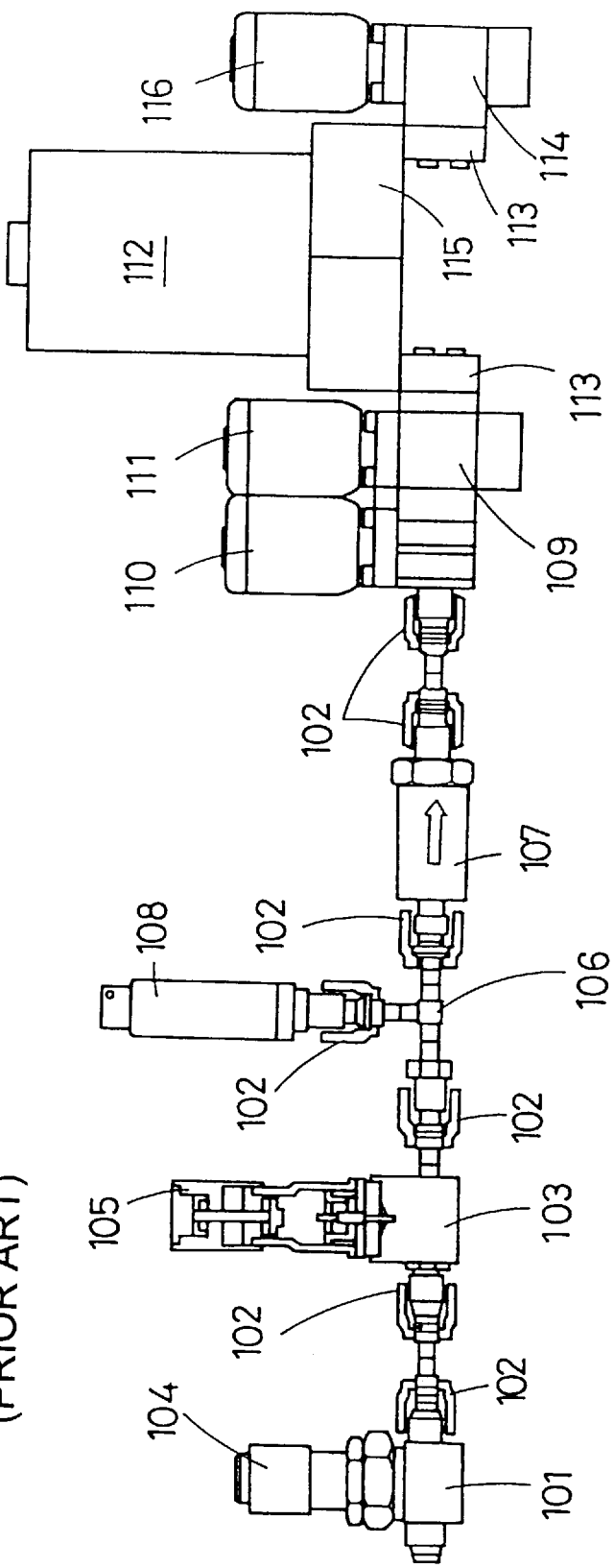
FIG. 14 is a side view showing a conventional gas supply unit.
Figure 15:
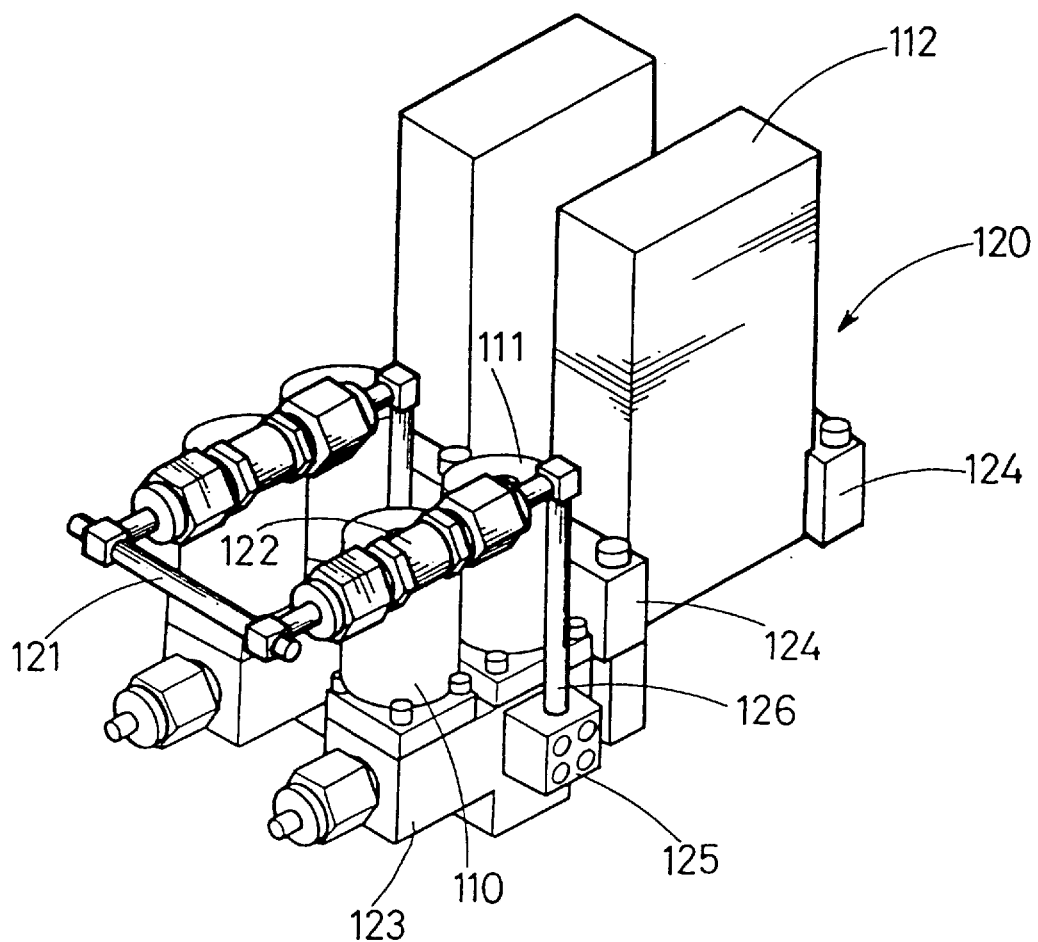
FIG. 15 is a perspective view showing a conventional gas supply integrated unit.

As shown by FIG. 13 the check valve 36 is integrated only by fixing the cover 61 by bolts 71 and therefore, interchange of parts such as the return spring 67 or the like can be facilitated.

Further, according to a gas supply unit of the embodiment, the gas channels 47a, 47b, 48a, 48b, 48c, 48d, 49a, 49b and 49c are formed in the series of fixing blocks where the filter block 45, the first block 41 and the second block 42 are integrated and therefore, pipings are not needed to connect by welding as in the conventional example. Accordingly, the formation of particles due to the corrosion of welded portions by corrosive gas can be prevented.

Incidentally, the present invention is not limited to the above-described embodiments but can be modified variously within the range from which the gist is not deviated.

For example, according to the above-described embodiments, the poppet structure using the return spring 67 is adopted to the check valve 36. However, a structure utilizing pressure on a diaphragm caused by gas pressure of the supply gas F may be adopted by using a diaphgram valve. The diaphgram valve has an advantage resolving the problem of the poppet structure in which when the pressure is balanced by the return spring 67, the valve 65 is vibrated whereby a pulsated stream is caused or particles are formed by scrubbing abrasive portions.

Further, the respective component parts may not be arranged in accordance with the above-described embodiments but, for example, the check valve 36 may be attached to the filter block 45 while the filter 32, a pressure sensor or valves etc. may be attached to the second block 42 as necessary.

According to the gas supply unit of the present invention, the mass flow unit having the first opening and closing valve, the second opening and closing valve, the mass flow controller, the purge valve and the filter and integrally constituted by screw-fastening them to the respective blocks where channels are formed, from a predetermined direction, and the pressurizing system unit where the manual valve manually supplying or isolating the supply gas, the regulator for regulating the gas pressure of the supply gas and the pressure gage for monitoring the pressure of the supply gas are integrally fixed via the series of fixing blocks where channels are formed, are fixed to the base where channels for communicating to the side of the mass flow unit are formed, by screw-fastening the series of fixing blocks from the predetermined direction. Therefore, the gas supply unit of the present invention can be downsized by dispensing with connection parts etc. such as joints, pipes and the like among component parts and maintenance etc. of the manual valve or the like can be facilitated.

Further, according to the gas supply unit of the present invention, the first channel communicating the pipe supplying gas with the manual valve, the second channel communicating the manual valve with the regulator, the third channel communicating the regulator with the channel formed in the base and the fourth channel communicating the pressure gage with the third channel, are formed in the series of fixing blocks comprising the manual valve block, the regulator block and the pressure gage block constituting the pressurizing system unit, the screw-fastening portion for fastening the series of fixing blocks to the base is installed at the manual valve block and the joint portion between the third channel and the channel formed in the base is formed in the manual valve block whereby the joint portion is strongly tightened and the air tight performance can be promoted.

According to the gas supply unit of the present invention, when the manual valve block, the regulator block and the pressure gage block constituting the pressurizing system unit are integrated, the air tight performance can further be promoted.

Additionally, the gas supply unit of the present invention is constituted by the series of fixing blocks in which the channels of the supply gas and the purge gas are formed and which are provided with the attaching portions for fixedly installing the filter, the opening and closing valves, the mass flow controller, the purge valve and the check valve above the channels whereby a compact gas supply integrated unit in which parts are integrated such that the unit can be arranged in a narrow floor space, can be provided and a gas supply integrated unit preventing formation of particles caused by welding can be provided.

What is claimed is:

1. A gas supply unit comprising:

opening and closing valves for regulating flow of a supply gas;

a mass flow controller for controlling a flow rate of the supply gas;

a purge valve for supplying a replacement gas for excluding the supply gas remaining in the mass flow controller;

first fixing blocks having first channels for the flow of supply gas and a purge gas and provided with attaching portions for fixedly installing the opening and closing valves, the mass flow controller and the purge valve above the first channels;

second fixing blocks for fixedly installing thereon fluid element parts and having second channels for the supply gas and the purge gas; and a base block having a communicating channel for connecting the first and second channels, the first fixing blocks and the second fixing blocks being integrally mounted on the base block with surfaces of the first and second fixing blocks directly contacting a surface of the base block.

2. The gas supply unit according to claim 1, wherein the fluid element parts are included in a pressurizing system unit fixedly integrated with a manual valve for manually carrying out supply or isolation of the supply gas, a regulator for regulating pressure of the supply gas and a pressure gage for monitoring the pressure of the supply gas via the second channels.

3. The gas supply unit according to claim 2, wherein the second fixing blocks include a manual valve block to which the manual valve is attached; and wherein the manual valve block has a screw-fastening portion for fastening the second fixing blocks to the base block.

4. The gas supply unit according to claim 3, wherein the second fixing blocks include a regulator block to which the regulator is attached;

wherein a first of the second channels for communicating a pipe supplying a gas with the manual valve, a second of the second channels for communicating the manual valve with the regulator and a third of the second channels for communicating the regulator with the communicating channel formed in the bases are formed in the manual valve block and the regulator block; and wherein the regulator block is screw-fastened to the manual valve block in a direction orthogonal to the first direction.

5. The gas supply unit according to claim 4, wherein the second fixing blocks include a pressure gage block to which the pressure gage is attached; and wherein the pressure gage block is screw-fastened to the regulator block in the direction orthogonal to the first direction.

6. The gas supply unit according to claim 2, wherein the second fixing blocks include a manual valve block, a regulator block and a pressure gage block;

wherein a first of the second channels for communicating a pipe for supplying a gas with the manual valve, a second of the second channels for communicating the manual valve with the regulator, a third of the second channels for communicating the regulator with the communicating channel formed in the base block and a fourth of the second channels communicating the pressure gage with the third of the second channels are formed in the second fixing blocks; and wherein a screw-fastening portion for fastening the fixing blocks to the base is provided at the manual valve block and a junction between the third of the second channels and the communicating channel formed in the base is formed in the manual valve block.

7. The gas supply unit according to claim 2, wherein the pressurizing system unit includes a manual valve block, a regulator block and a pressure gage block that are integrally joined.

8. The gas supply unit according to claim 1, wherein the fluid element parts include a check valve for preventing the supply gas from flowing to a side of supplying the purge gas.

9. The gas supply unit according to claim 8, wherein the first attaching portion for fixedly installing the opening and closing valves, the mass flow controller and the purge valve and the second attaching portion for fixedly installing the check valve are installed on a straight line in a plan view.

* * * * *

UNITED STATES PATENT AND TRADEMARK OFFICE
CERTIFICATE OF CORRECTION

PATENT NO. : 5,819,782
DATED : October 13, 1998
INVENTOR(S) : ITAFUJI

It is certified that error appears in the above-indentified patent and that said Letters Patent is hereby corrected as shown below:

Claim 1, col. 14, line 1, "bases" should read --base--.

Signed and Sealed this

Fifteenth Day of June, 1999

Attest:

Q. TODD DICKINSON

*Attesting Officer*   *Acting Commissioner of Patents and Trademarks*